(12) United States Patent
Larzul et al.

(10) Patent No.: US 10,599,794 B2
(45) Date of Patent: Mar. 24, 2020

(54) EFFICIENT POWER ANALYSIS

(71) Applicant: Synopsys, Inc., Mountain View, CA (US)

(72) Inventors: Ludovic Marc Larzul, Folsom, CA (US); Frederic Maxime Emirian, Antony (FR)

(73) Assignee: Synopsys, Inc., Mountain View, CA (US)

( * ) Notice: Subject to any disclaimer, the term of this patent is extended or adjusted under 35 U.S.C. 154(b) by 923 days.

(21) Appl. No.: 14/507,687

(22) Filed: Oct. 6, 2014

(65) Prior Publication Data

US 2016/0098504 A1 Apr. 7, 2016

(51) Int. Cl.
*G06F 17/50* (2006.01)

(52) U.S. Cl.
CPC ...... *G06F 17/5027* (2013.01); *G06F 17/5036* (2013.01); *G06F 2217/78* (2013.01)

(58) Field of Classification Search
CPC ............. G06F 17/5027; G06F 17/5036; G06F 2217/78
See application file for complete search history.

(56) References Cited

U.S. PATENT DOCUMENTS

| 5,321,828 A * | 6/1994 | Phillips | G06F 11/3652 703/28 |
| 8,352,235 B1 * | 1/2013 | Lin | G06F 17/5036 703/14 |
| 2003/0069724 A1 | 4/2003 | Schubert et al. | |
| 2003/0171908 A1 * | 9/2003 | Schilp | G06F 17/5022 703/16 |
| 2005/0223300 A1 | 10/2005 | Baartmans et al. | |
| 2006/0058994 A1 | 3/2006 | Ravi et al. | |

(Continued)

FOREIGN PATENT DOCUMENTS

| JP | 2004-062238 A | 2/2004 |
| JP | 2010-182241 A | 8/2010 |

(Continued)

OTHER PUBLICATIONS

PCT International Search Report and Written Opinion, PCT Application No. PCT/US15/48200, dated Dec. 7, 2015, 14 pages.

(Continued)

*Primary Examiner* — Brian W Wathen
*Assistant Examiner* — Carina Yun
(74) *Attorney, Agent, or Firm* — Fenwick & West LLP

(57) ABSTRACT

Embodiments relate to the emulation of circuits, and tracking states of signals in an emulated circuit for performing power analysis. A host system incorporates power analysis logic into a design under test (DUT). An emulator emulates the DUT along with the incorporated power analysis logic. Based on the power analysis logic, during a power analysis clock cycle, the emulator selects a signal from a plurality of signals of the DUT. The emulator determines whether a state event is detected for the selected signal. If the state event is detected, a state count is updated for the selected signal that indicates a number of state events detected for the selected signal during emulation of the DUT. If the state count reaches a threshold number based on the update, the emulator transmits a count update signal to the host system indicating that the state count reached the threshold number.

17 Claims, 7 Drawing Sheets

(56) References Cited

U.S. PATENT DOCUMENTS

2006/0277509 A1   12/2006  Tung et al.
2009/0271167 A1   10/2009  Zhu et al.
2012/0216080 A1    8/2012  Bansal et al.

FOREIGN PATENT DOCUMENTS

JP        2014-016830 A    1/2014
WO   WO 2008/081669 A1  7/2008

OTHER PUBLICATIONS

European Patent Office, Extended European Search Report and Opinion, European Patent Application 15848580.5, dated May 3, 2018, 12 pages.
Japan Patent Office, First Office Action, JP Patent Application No. 2017-518476, dated Aug. 7, 2018, 6 pages.
European Patent Office, Office Action, European Application No. 15848580.5, dated Dec. 27, 2019, 8 pages.
Xilinx, "Vivado Design Suite User Guide Power Analysis and Optimization," UG907, Jun. 19, 2013, 77 pages [Online] [Retrieved Jan. 14, 2020] Retrieved from the internet <URL: https://www.xilinx.com/support/documentation/sw_manuals/xilinx2013_2/ug907-vivado-power-analysis-optimization.pdf>.

\* cited by examiner

100

EFFICIENT POWER ANALYSIS

BACKGROUND

1. Field of Art

The disclosure generally relates to the emulation of circuits, and more specifically to tracking the states of signals in an emulated circuit.

2. Description of the Related Art

Emulators have been developed to assist circuit designers in designing and debugging highly complex integrated circuits. An emulator includes multiple reconfigurable components, such as field programmable gate arrays (FPGAs) that together can imitate the operations of a design under test (DUT). By using an emulator to imitate the operations of a DUT, designers can verify that a DUT complies with various design requirements prior to a fabrication.

An aspect of emulation includes analyzing the power consumption of a DUT. Power analysis involves tracking the states of multiple signals in the DUT. For each signal that is tracked, an emulator typically has to implement numerous hardware resources (e.g., multiple registers or memories). Since billions of signals are typically tracked, a great amount of hardware resources have to be implemented by the emulator, which slows down the emulation process and limits the size of a DUT for which power analysis can be performed.

In addition, the tracking of signals in a DUT results in the emulator generating large amounts of data (e.g., multiple terabytes of data). The data is transferred to a host system for processing. However, transferring the data to the host system requires a large amount of bandwidth. Therefore, conventional power analysis in an emulation environment is inefficient in terms of hardware and communication resources.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

Configuration Overview

A disclosed system (and method and computer program product) includes an emulation environment that performs efficient power analysis of a digital circuit by limiting the amount of hardware resources used for tracking the states of signals and by reducing communication bandwidth during an emulation.

One embodiment of the emulation environment includes a host system and an emulator. The host system incorporates power analysis logic into a design under test (DUT) and configures the emulator to emulate the DUT with the incorporated power analysis logic. During emulation, the power analysis logic tracks multiple signals of the DUT. The host system performs power analysis based on the tracked signals.

In one aspect, through multiplexing the power analysis logic is able to track multiple signals with limited hardware resources. Further, the power analysis logic reduces communication bandwidth required between the host system and the emulator by transmitting states, event counts or state counts of the tracked signals in a distributed manner. As described herein, power analysis refers to collecting and/or analyzing global or local activity of a design with the goal of evaluating the amount of power the design will consume.

Example Emulation Environment

Figure 1:
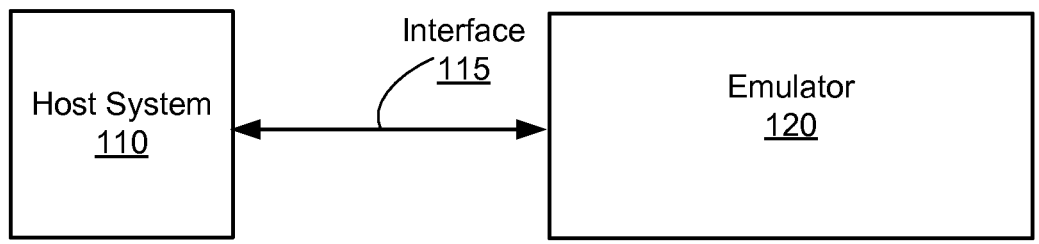
FIG. 1 is a block diagram of an emulation environment, according to one embodiment.

FIG. 1 is a block diagram illustrating an emulation environment 100, according to one embodiment. The emulation environment 100 includes a host system 110 and an emulator 120. The host system 110 communicates with the emulator 120 through an interface 115.

The host system 110 configures the emulator 120 for emulating a DUT and communicates with the emulator 120 during emulation of the DUT. A DUT is one or more circuit designs that are to be emulated by the emulator 120. The host system 110 may be a single computer or a collection of multiple computers. In the embodiment where the host system 110 is comprised of multiple computers, the functions described herein as being performed by the host system 110 may be distributed among the multiple computers.

The host system 110 receives from a user a description of a DUT to be emulated. The description of the DUT is in a type of hardware description language (HDL), for example, register transfer language (RTL). The host system 110 creates a gate level netlist based on the HDL description of the DUT. The host system 110 uses the netlist to partition the DUT and map each partition to one or more logic circuits included in the emulator 120.

The host system 110 incorporates power analysis logic into the DUT that tracks the states of multiple signals in the DUT. In one embodiment, for each tracked signal, the power analysis logic tracks the number of high states, the number of low states, and the number of toggles between a low state and high state or vice versa. In another embodiment, instead of counting the number of high states, low states, and toggles for each individual tracked signal, each count is associated/maintained for multiple signals. As an example, for a group of signals that includes a first signal and a second signal, the power analysis logic may count that collectively the group of signals have had '120' toggles (e.g., '80' toggles by the first signal and '40' toggles by the second signal).

In one embodiment, the host system 110 incorporates the power analysis logic into the DUT prior to creating the gate level netlist. In other embodiments, the power analysis logic is incorporated into the DUT after creating the gate level netlist and before or after partitioning the DUT. Alternatively, the power analysis logic may be incorporated into the DUT at different stages. For example, a portion of the power analysis logic can be incorporated prior creating the gate level netlist and another portion can be incorporated after creating the gate level netlist.

The host system 110 transmits a description of the DUT with the incorporated power analysis logic (gate level or RTL description) to the emulator 120 in one or more bit streams through the interface 115. The bit streams may also include representations of the DUT, partitioning information, mapping information, and design constraints for configuring the emulator 120.

Additionally, during emulation of the DUT by the emulator 120, the host system 110 receives emulation results from the emulator 120 through the interface 115. Emulation results are information generated by the emulator 120 based on the emulation of the DUT. In one aspect, the emulation results include power analysis information which is information used in determining the power consumption of the DUT. The power analysis information received from the emulator includes counts of the states of multiple signals in the DUT during the emulation. The emulator 120 generates the counts based on the emulation of the power analysis logic incorporated into the DUT.

The host system 110 may process and convert the emulation results for analysis and display to users. Based on the emulation results, the user may iterate the process of modifying the DUT, executing the emulation and performing analysis until design requirements are satisfied.

The emulator 120 is a hardware system that emulates DUTs. The emulator 120 includes multiple configurable logic circuits that together can emulate a DUT. In one embodiment, the logic circuits included in the emulator are field-programmable gate arrays (FPGAs).

For a DUT that is to be emulated, the emulator 120 receives from the host system 110 or from other computing devices (not shown) one or more bit streams including a description of the DUT with the incorporated power analysis logic. The bit streams further describe partitions of the DUT created by the host system 110, mappings of the partitions to the FPGAs of the emulator 120, and design constraints. Based on the bit streams, the emulator 120 configures the FPGAs to perform the functions of the DUT.

The emulator 120 emulates the DUT along with the incorporated power analysis logic. Based on the emulation, the emulator 120 generates emulation results, which are transmitted to the host system 110 for analysis.

The interface 115 is a communication medium that allows communication between the host system 110 and the emulator 120. In one embodiment, the interface 115 is a cable with electrical connections. For example, the interface 115 may be an RS232, USB, LAN, optical, or a custom built cable. In other embodiment, the interface 115 is a wireless communication medium or a network. For example, the interface 115 may be a wireless communication medium employing a Bluetooth® or IEEE 802.11 protocol.

Figure 2:
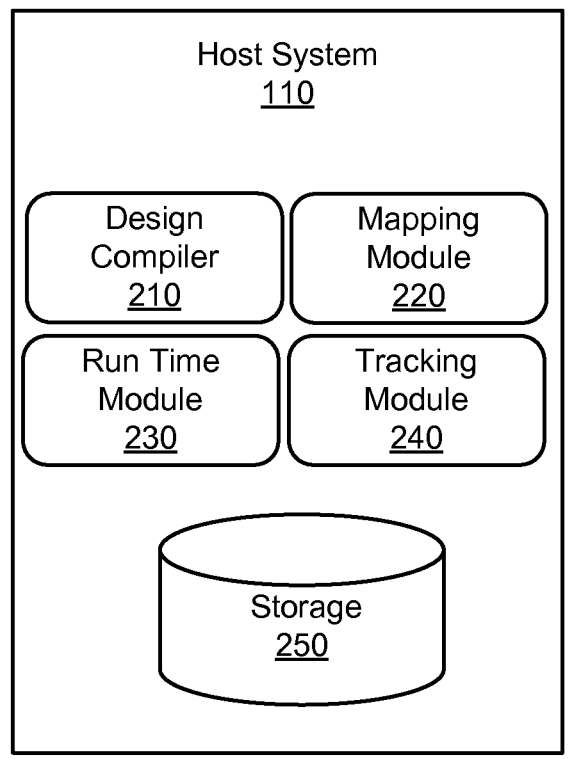
FIG. 2 is a block diagram illustrating a host system, according to one embodiment.

FIG. 2 is a block diagram illustrating the host system 110 in more detail, according to one embodiment. The host system 110 includes a design compiler 210, mapping module 220, run time module 230, tracking module 240, and storage 250. Each of these components may be embodied as hardware, software, firmware, or a combination thereof. Together these components provide designs to configure the emulator 120 and monitor the emulation results.

The design compiler 210 converts HDL of DUTs into gate level logic. For a DUT that is to be emulated, the design compiler 210 receives a description of the DUT in HDL (e.g., RTL or other level of abstraction). The design compiler 210 synthesizes the HDL of the DUT to create a gate level netlist with a description of the DUT in terms of gate level logic.

In one embodiment, the design compiler 210 incorporates power analysis logic into the DUT. In one embodiment, the design compiler 210 incorporates the power analysis logic prior to synthesizing the HDL to create the netlist. In this embodiment, prior to synthesizing, the design compiler 210 retrieves HDL of the power analysis logic from the storage 250 and edits the HDL of the DUT to include the retrieved HDL of the power analysis logic.

In another embodiment, the design compiler 210 incorporates the power analysis logic after creating the netlist for the DUT. In this embodiment, the design compiler 210 retrieves a gate level description of the power analysis logic from the storage 250 and edits the gate level netlist to include the gate level description of the power analysis logic.

In another embodiment, the design compiler 210 incorporates the power analysis logic at distributed levels. The design compiler 210 incorporates a portion of the power analysis logic prior to synthesizing the HDL and another portion of the power analysis logic after synthesizing the HDL.

Figure 3:
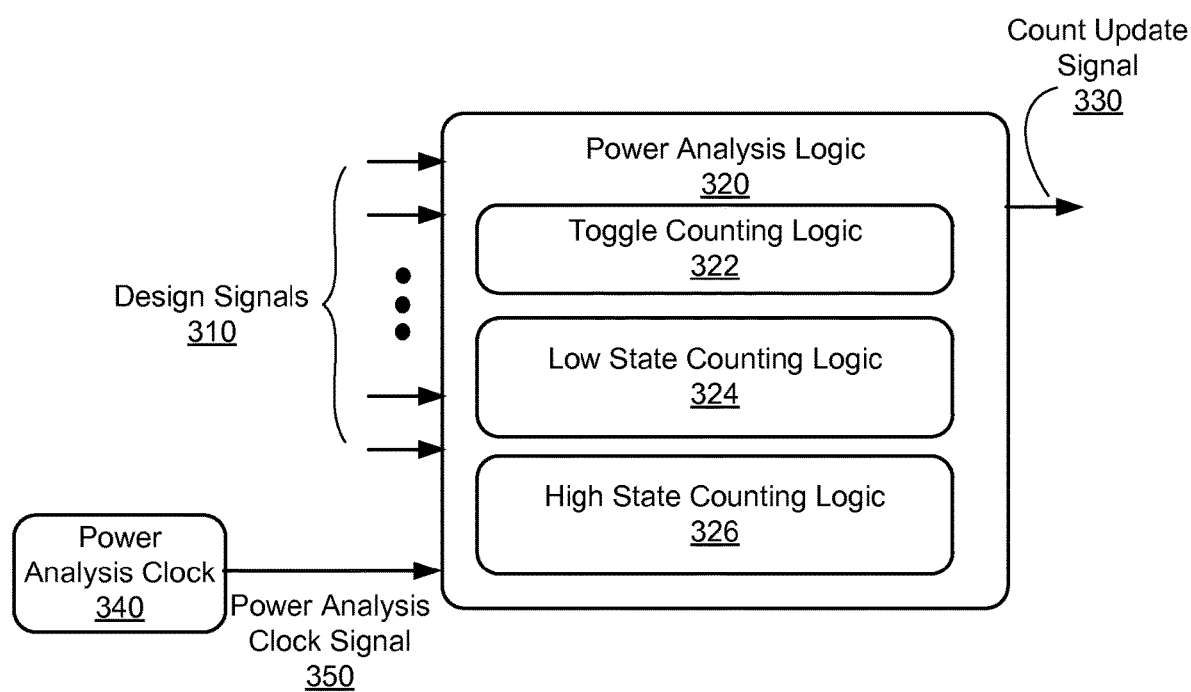
FIG. 3 is a block diagram of power analysis logic included in a design under test (DUT), according to one embodiment.

FIG. 3 illustrates the power analysis logic 320 incorporated into the DUT, according to one embodiment. The power analysis logic 320 includes a toggle counting logic 322, a low state counting logic 324, and a high state counting logic 326 (collectively referred to as "counting logics"). Each of the counting logics receives signals 310 from the DUT (also referred to as "design signals") and a power analysis clock signal 350 generated by a power analysis clock 340. The power analysis clock 340 generates the power analysis clock signal 350 at a higher frequency than a design clock (not shown) of the DUT. By generating the power analysis clock signal 350 at a higher frequency, it allows the counting logics to analyze each design signal 310 during a single cycle of the DUT's design clock. For example, the operating frequency of the DUT may be 1 MHz, and a maximum frequency of the power analysis clock 340 may be 1 GHz to analyze up to '1000' design signals 310 per one design clock cycle (i.e., the multiplexing rate is '1000').

Each of the counting logics counts a number of state events for each design signal. A state event is an event related to the state of a signal. In one embodiment, the state event that the toggle counting logic 322 counts for each design signal 310 is the number of toggles (i.e., the number of toggle events). A toggle is when a signal transitions from one state to another. For example, when a signal transitions from a high state (e.g., logic '1', 'HIGH', 'TRUE' or VDD)

to a low state (e.g., logic '0', 'LOW', 'FALSE', or ground) or from a low state to a high state. The state event that the low state counting logic 324 counts for each design signal 310 is the number of low states (i.e., the number of low state events). The high state counting logic 326 counts the number of high states for each design signal 310 (i.e., the number of high state events).

During each cycle of the power analysis clock 340, each of the counting logics analyzes a selected design signal 310 to determine whether its respective state event has occurred. Therefore, the toggle counting logic 322 determines whether the selected design signal 310 has toggled (e.g., whether the selected signal 310 has transitioned to a state during the current cycle that is different from its state in the previous cycle), the low state counting logic 324 determines whether the selected signal 310 is at a low state, and the high state counting logic 326 determines whether the selected signal 310 is at a high state.

If a counting logic determines that its respective state event has occurred with respect to the selected design signal 310, the counting logic increments by one a state count maintained for the selected design signal 310. In one embodiment, for each design signal 310, the toggle counting logic 322 maintains a toggle count of the number of toggles of the signal, the low state counting logic 324 maintain a low count of the number of low states of the signal, and the high state counting logic 326 maintain a high count of the number of high states of the signal. In another embodiment, design signals are grouped and each counting logic maintains a count of the number of state events that occurred for the group of signals.

During the next cycle of the power analysis clock 340 a new design signal 310 is selected and analyzed by the counting logics. As described above, because the power analysis clock 340 is faster than the design clock of the DUT, the counting logics are able to analyze each design signal 310 during a single cycle of the DUT's design clock.

When counting logic increments a count of a design signal 310, the counting logic determines whether the count has been incremented to a threshold number. If the count has reached the threshold number, the counting logic outputs a count update signal 330 and resets the count to an initial value (e.g., zero). For example, assume the threshold number is '16' and the toggle count maintained by the toggle counting logic 322 for a design signal 310 is currently '15.' If the toggle counting logic 322 analyzes the design signal 310 and determines an additional toggle has occurred, upon incrementing the toggle count to '16,' the toggle counting logic 322 would output a count update signal 330 and reset the count to zero. The count update signal 330 notifies the host system 110 that the threshold number has been reached so that it can update an aggregate count for the design signal 310, as described in more detail below with regards to the tracking module 240 of FIG. 2.

By only outputting a count update signal 330 when a count of the counting logic reaches a threshold number, it minimizes the amount of communication between the emulator 120 and the host system 110 during emulation of the DUT with the power analysis logic 320. Hence, the host system 110 is not notified about each individual state event detected for a signal. Further, because the power analysis logic 320 is able to track the states of multiple design signals 310, it minimizes the amount of hardware resources that need to be emulated by the emulator 120 to track the states of the design signals 310. The circuitry of each counting logic is described below with reference to FIGS. 4 and 5.

Returning to FIG. 2, the mapping module 220 partitions DUTs and maps partitions to emulator components. After the design compiler 210 creates a gate level netlist of the DUT, the mapping module 220 partitions the DUT at the gate level into a number of partitions using the netlist. In the embodiment where the design compiler 210 incorporates the power analysis logic into the DUT, the mapping module 220 partitions the DUT with the incorporated power analysis logic. In another embodiment, the mapping module 220 incorporates the power analysis logic instead of the design compiler 210. In this embodiment, based on a gate level netlist of the DUT, the mapping module 220 partitions the DUT and incorporates the power analysis logic to one or more partitions.

The mapping module 220 maps each partition to one or more FPGAs of the emulator 120. The mapping module 220 performs the partitioning and mapping using design rules, design constraints (e.g., timing or logic constraints), and information about the emulator 120. For each partition, the mapping module 220 generates a bit stream describing the design logic included in the partition and the mapping to one or more FPGAs of the emulator 120. The bit streams may also include information about connections between components and other design information. The mapping module 220 transmits the bits streams to the emulator 120 so that the FPGAs of the emulator 120 can be configured for emulating the DUT with the power analysis logic 320.

The run time module 230 controls emulations performed on the emulator 120. The run time module 230 may cause the emulator 120 to start or stop executing the emulations. Additionally, the run time module 230 may provide input signals/data to the emulator 120. The input signals may be provided directly to the emulator 120 through the interface 115 or indirectly through other input signal devices. For example, the host system 110 with the run time module 230 may control an input signal device such as a test board, signal generator, or a power supply, to provide the input signals to the emulator 120.

The tracking module 240 processes emulation results produced by the emulator 120. During the emulation of a DUT by the emulator 120, the tracking module 240 receives emulation results from the emulator 120. The emulation results received from the emulator 120 include count update signals 330. A count update signal 330 indicates that a specific state count of a design signal 310 being tracked by power analysis logic 320 has reached a threshold number.

For each design signal 310 of the DUT being tracked by the power analysis logic 320, the tracking module 240 maintains in the storage 250 an aggregate toggle count, an aggregate low count, and an aggregate high count. The aggregate toggle count is the total number of toggles that have been counted for the design signal 310 during emulation of the DUT. The aggregate low count is the total number of low states counted and the aggregate high count is the total number of high states counted during emulation.

When the tracking module 240 receives a count update signal 330 indicating that a specific state count of a design signal 310 has reached a threshold number, the tracking module 240 updates the appropriate aggregate count. In one embodiment, the tracking module 240 increments the appropriate aggregate count by the threshold number. Hence, if the count update signal 330 indicates that the toggle count maintained by the toggle counting logic 322 for the design signal 310 has reached a threshold number, the tracking module 240 increments the aggregate toggle count of the design signal 310 in the storage 250 by the threshold number. If the count update signal 330 indicates that the low count maintained by the low state counting logic 324 for the design signal 310 has reached a threshold number, the tracking module 240 increments the aggregate low count of the design signal 310 by the threshold number. Similarly, if the count update signal 330 indicates that the high count maintained by the high state counting logic 326 for the design signal 310 has reached a threshold number, the tracking module 240 increments the aggregate high count of the design signal 310 by the threshold number.

In one embodiment, when emulation of the DUT is complete, the tracking module 240 receives from the emulator 120, for each design signal 310, a current value of the toggle count, low count, and high count currently stored by the counting logics. The tracking module 240 increments for each design signal 310 the aggregate toggle count of the design signal 310 by the received current toggle count value, the aggregate low count of the design signal 310 by the received current low count value, and the aggregate high count of the design signal 310 by the received current high count value. This is done so that at the end of the emulation, each aggregate count will include a true value of the total number of state events that occurred during the emulation.

For example, assume that at the end of emulation the toggle count maintained by the toggle counting logic 322 for a design signal 310 has a value of '15.' Further assume that the toggle counting logic 322 only outputted count update signals when threshold number '16' was reached by a count. Because the toggle count value did not reach '16,' the current value of '15' has not been accounted for. Therefore, when the emulation is complete, the aggregate toggle count of the design signal 310 has to be incremented by '15.'

Further, when emulation of the DUT is complete, the tracking module 240 creates a result file that includes the aggregate toggle count, the aggregate low count, and the aggregate high count of each design signal 310. In one embodiment, the result file is a Switching Activity Interchange Format (SAIF) file. The tracking module 240 stores the result file in the storage 250. The file may be used to determine power consumption of the DUT.

Figure 4:
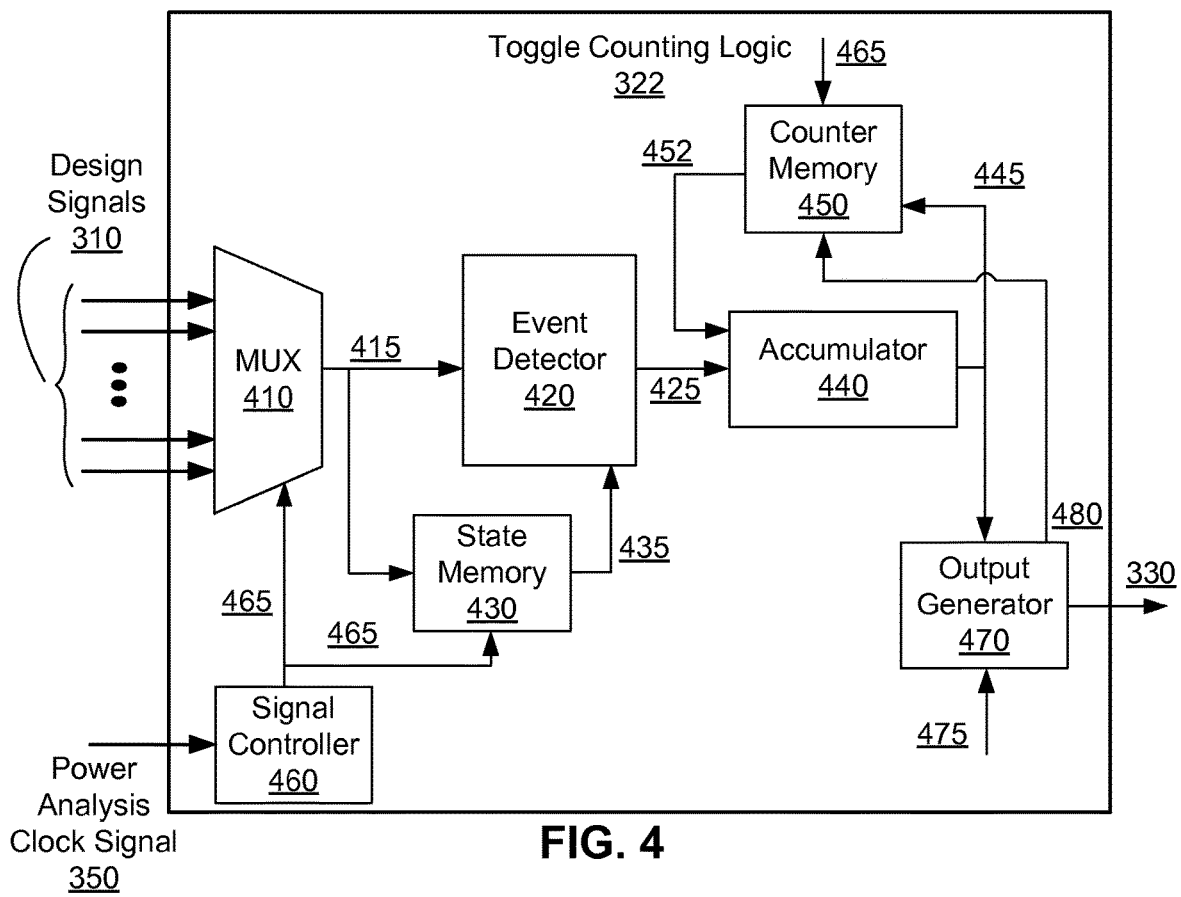
FIG. 4 is a circuit diagram of toggle counting logic, according to one embodiment.

FIG. 4 is a circuit diagram of the toggle counting logic 322, according to one embodiment. The toggle counting logic 322 includes a Multiplexer (MUX) 410, an event detector 420, a state memory 430, an accumulator 440, a counter memory 450, a signal controller 460, and an output generator 470. Together, these components count a number of toggles for each of the design signals 310 for performing power analysis of the DUT.

The signal controller 460 controls the toggle counting logic 322 for counting a number of toggles according to multiplexing of the design signals 310. In one embodiment, the signal controller 460 is a counter logic circuit. The signal controller 460 receives the power analysis clock signal 350 from the power analysis clock 340. The signal controller 460 generates as an output a design signal address output 465 to the MUX 410, the state memory 430, and the counter memory 450.

In a design clock cycle, the signal controller 460 counts a design signal address from an initial number to a maximum number according to the power analysis clock signal 350. The initial number corresponds to a first design signal address (e.g., zero) and the maximum number corresponds to a last signal address (e.g., a multiplexing rate or a number of design signals 310 subtracted by one). Each design signal address corresponds to a design signal 310. During every power analysis clock cycle, the signal controller 460 increments the design signal address and outputs the incremented design signal address as the design signal address output 465. The design signal address output 465 indicates to the MUX 410, the state memory 430, and the counter memory 450, the design signal 310 that will be analyzed by the toggle counting logic 322 during the current power analysis clock cycle. When the design signal address has been incremented to the maximum number or the next design clock cycle starts, the signal controller 460 resets the design signal address to the initial number corresponding to the first design signal address. Hence, the signal controller 460 generates the design signal address output 465 by sequentially incrementing the design signal address from the initial number to the maximum number for every power analysis clock signal 350 in a single design clock cycle.

The MUX 410 selects a design signal 310 to be analyzed during a current cycle of the power analysis clock 340. The MUX 410 receives the design signals 310 of the DUT as inputs and outputs a selected design signal 415. From the multiple design signals 310 that the MUX 410 receives as inputs, the MUX 410 selects a single design signal 310 to output as the selected design signal 415. The MUX 410 selects the design signal 310 that corresponds to the design signal address output 465 received from the signal controller 460.

The state memory 430 stores the state of each of the design signals 310 in the previous design clock cycle. The state memory 430 receives as inputs the selected design signal 415 from the MUX 410 and the design signal address output 465 from the signal controller 460. Based on the design signal address output 465, the state memory 430 outputs a state of the selected design signal 415 in the previous design clock cycle. The state in the previous design clock cycle is output by the state memory 430 as previous design signal 435. Further, the state memory 430 stores the current state of the selected design signal 415 received from the MUX 410. The stored current state is used during the next design clock cycle.

The event detector 420 determines whether a toggle event has occurred with respect to the selected design signal 415. The event detector 420 receives as inputs the selected design signal 415 from the MUX 410 and the previous design signal 435 from the state memory 430. The event detector 420 compares the state of the selected design signal 415 and the state of the previous design signal 435. The event detector 420 outputs an event detection signal 425 based on the comparison that indicates whether the state of the selected design signal is the same as the state of the previous design signal 435. Hence, the event detection signal 425 indicates whether the selected design signal 415 has toggled from its previous state during the current design clock cycle. For example, the event detection signal 425 may have a high state if the selected design signal 415 has toggled and a low state if the selected design signal 415 has not toggled.

The accumulator 440 increments a toggle count when a toggle event occurs. The accumulator 440 receives as inputs the event detection signal 425 from the event detector 420 and a previous state count 452 from the counter memory 450. The previous state count 452 indicates a toggle count, which is a number of toggle events that have been counted for the selected design signal 415. If the event detection signal 425 indicates that a toggle event has occurred (i.e., the selected design signal 415 has toggled from its previous state), the accumulator 440 increments the toggle count of the selected design signal 415. In one embodiment, the accumulator 440 increments the toggle count by a value of one. If the event detection signal 425 indicates the toggle event has not occurred, the accumulator 440 maintains the toggle count of the selected design signal 415 at its current value. The accumulator 440 outputs the current value of the toggle count as a current state count 445 after accounting for whether a toggle event occurred.

The counter memory 450 stores a toggle count for each of the design signals 310. The counter memory 450 receives as inputs the design signal address output 465 from the signal controller 460 and the current state count 445 from the accumulator 440. Based on the design signal address output 465, the counter memory 450 identifies the current value of the toggle count maintained for the selected design signal 415 and outputs the current value as the previous state count 452 for use by the accumulator 440 as described above. When the counter memory 450 receives the current state count 445 from the accumulator 440, the current state count 445 indicates what the value of the toggle count should be after taking into account whether a toggle event has occurred during the current design clock cycle. In one embodiment, if the value received in the current state count 445 is different than the toggle count value stored for the selected design signal 415, the counter memory 450 updates the toggle count to have the value received from the accumulator 440. In another embodiment, the counter memory 450 updates the toggle count to have the value indicated by the current state count 445 regardless of whether the value has changed.

The output generator 470 receives the current state count 445 and a threshold indicator 475. In one embodiment, if the toggle count of the selected design signal 415 is updated in the counter memory 450 based on the current state count 445, the output generator 470 determines whether a threshold number according to the threshold indicator 475 has been reached for the toggle count. If the threshold number has been reached, the output generator 470 outputs a count update signal 330 to the host system 110. The count update signal 330 indicates to the host system 110 that the threshold number has been reached for the toggle count of the selected design signal 415. As described above with reference to FIG. 2, the count update signal 330 is used by the host system 110 to update an aggregate toggle count maintained for the selected design signal 415. In addition, the output generator 470 outputs a reset signal 480 to the counter memory 450 to reset the toggle count of the selected design signal 415 to an initial value (e.g., 0).

Figure 5:
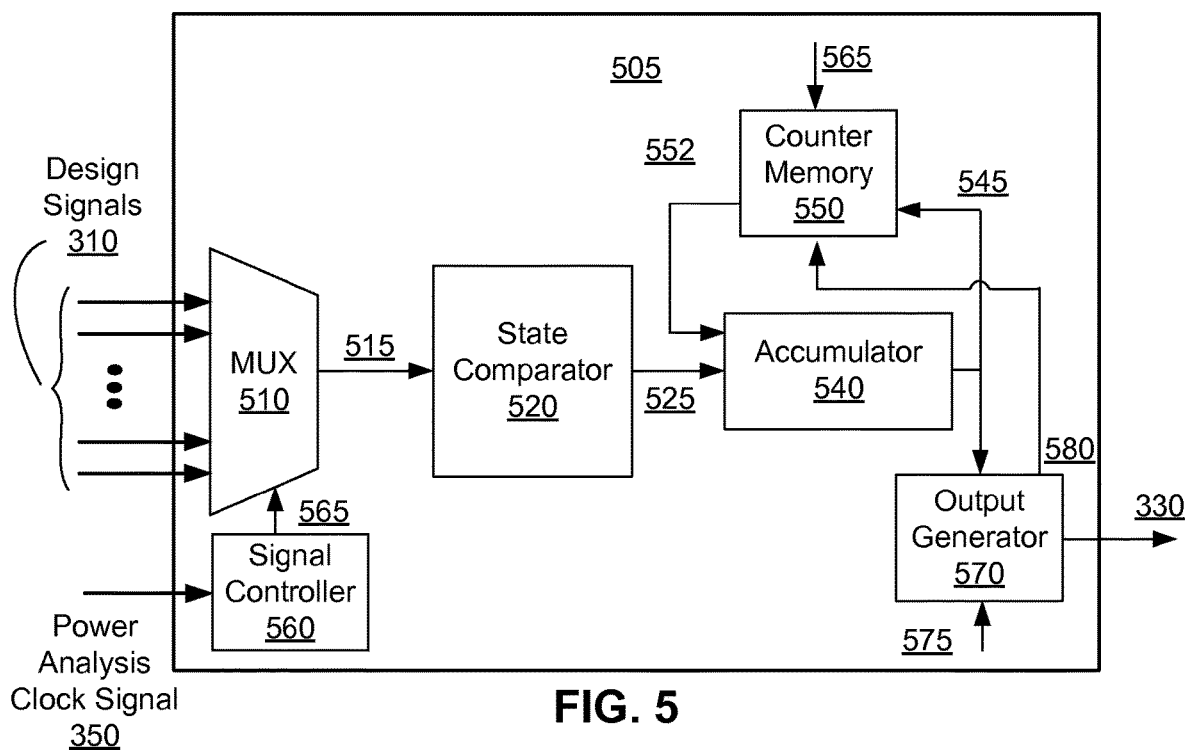
FIG. 5 is a circuit diagram of a low state counting logic and a high state counting logic, according to one embodiment.

FIG. 5 is a circuit diagram illustrating a circuit 505 used for the low state counting logic 324 and the high state counting logic 326, according to one embodiment. Hence, one circuit 505 would be included for the low state counting logic 324 and another circuit 505 would be included for the high state counting logic. The circuit 505 implemented as the low state counting logic 324 counts a number of low states for each of the design signals 310. The circuit 505 implemented as the high state counting logic 326 counts a number of high states for each of the design signals 310.

In another embodiment, only one circuit 505 may be included in the power analysis logic 320 to obtain counting of one state for the design signals 310. Counting of the other state for a design signal 310 may be obtained by subtracting the obtained count of the one state from the total number of design clock cycles. For example, the power analysis logic 320 may include circuit 505 as the low state counting logic 324 to count a number of low states for each of the design signals but not include a circuit 505 to count the number of high states. The number of high states of a design signal can be obtained by subtracting the counted number of low states from the total number of design clock cycles.

The circuit 505 includes a signal controller 560, a MUX 510, a state comparator 520, an accumulator 540, a counter memory 550, and an output generator 570. The components and configuration of the components of the circuit 505 are similar to those of the toggle counting logic 322 in FIG. 4. One difference is that the circuit 505 does not include the state memory 430, because a previous state of the design signals 310 does not need to be monitored. Another difference is that the circuit 505 includes the state comparator 520 instead of an event detector 420.

The signal controller 560 controls the circuit 505 according to multiplexing of the design signals 310. The signal controller 560 receives the power analysis clock signal 350 from the power analysis clock 340 and generates as an output a design signal address output 565 to the MUX 510 and the counter memory 550. Similar to the signal controller 460 of the toggle counting logic 322, during every power analysis clock cycle, the signal controller 560 increments a design signal address and outputs the incremented design signal address as the design signal address output 565.

The MUX 510 receives the design signals 310 as inputs and selects a single design signal 310 to output as the selected design signal 515. The MUX 510 selects the design signal 310 that corresponds to the design signal address output 565 received from the signal controller 560.

The state comparator 520 determine whether a state event has occurred with respect to the selected design signal 515. The state comparator 520 for the circuit 505 implemented as the low state counting logic 324 determines whether a low state event has occurred with respect to the selected design signal 515. The state comparator 520 for the circuit 505 implemented as the high state counting logic 326 determines whether a high state event has occurred with respect to the selected design signal 515. The state comparator 520 receives as inputs the selected design signal 515 from the MUX 510. The state comparator 520 determines the state of the selected design signal 515. The state comparator 520 implemented in the low state counting logic 324 determines whether the selected design signal 515 is in a low state and outputs an event detection signal 525 indicating whether the selected design signal 515 is in a low state during the current design clock cycle. The state comparator 520 implemented in the high state counting logic 326 determines whether the selected design signal 515 is in a high state and outputs an event detection signal 525 indicating whether the selected design signal 515 is in a high state during the current design clock cycle.

The accumulator 540 for the circuit 505 increments counts when state events occur. The accumulator 540 for the circuit 505 implemented as the low state counting logic 324 increments a low count when a low state event occurs. The accumulator 540 for the circuit 505 implemented as the high state counting logic 326 increments a high count when a high state event occurs. The accumulator 540 receives as inputs the event detection signal 525 from the state comparator 520 and a previous state count 552 from the counter memory 550.

For the accumulator 540 implemented in the low state counting logic 324, the received previous state count 552 indicates a low count, which is a number of low state events that have been counted for the selected design signal 515. If the event detection signal 525 indicates that the selected design signal 515 is in a low state, the accumulator 540 increments the low count (e.g., by a value of one). Otherwise, if the event detection signal 525 indicates that the selected design signal 515 is not in a low state, the accumulator 540 leaves the low count at its current value. The accumulator 540 outputs the current value of the low count as a current state count 545 after accounting for state of the selected design signal 515.

For the accumulator 540 implemented in the high state counting logic 326, the received previous state count 552 indicates a high count, which is a number of high state events that have been counted for the selected design signal 515. If the event detection signal 525 indicates that the selected design signal 515 is in a high state, the accumulator 540 increments the high count (e.g., by a value of one). Otherwise, if the event detection signal 525 indicates that the selected design signal 515 is not in a high state, the accumulator 540 leaves the high count at its current value. The accumulator 540 outputs the current value of the high count as the current state count 545 after accounting for a state of the selected design signal 515.

The counter memory 550 stores a state count for each of the design signals 310. The counter memory 550 for the circuit 505 implemented as the low state counting logic 324 stores a low count for each of the design signals 310. The counter memory 550 for the circuit 505 implemented as the high state counting logic 326 stores a high count for each of the design signals 310. The counter memory 550 receives as inputs the design signal address output 565 and the current state count 545.

Based on the design signal address output 565, the counter memory 550 identifies the current value of the state count maintained for the selected design signal 515 (low count for the low state counting logic 324 and high count for the high state counting logic 326) and outputs the current value as the previous state count 552 for use by the accumulator 540. When the counter memory 550 receives the current state count 545 from the accumulator 540, the current state count 545 indicates what the value of the state count should be for the selected design signal 515. The counter memory 550 updates the state count to have the value indicated by the current state count 545.

The output generator 570 receives the current state count 545 and a threshold indicator 575. In one embodiment, if a corresponding count (e.g., low count or high count) of the selected design signal 515 is updated in the counter memory 550 based on the current state count 545, the output generator 570 determines whether a threshold number according to the threshold indicator 575 has been reached for the corresponding count. If the threshold number has been reached, the output generator 570 outputs a corresponding count update signal 330 to the host system 110. In addition, the output generator 570 outputs a reset signal 580 to the counter memory 550 to reset the count of the selected design signal 515 to an initial value (e.g., 0). In one embodiment, a count update signal 330 can be multiplexed for transmission to the host system 110, together with other count update signals 330 or other information.

Although the toggle counting logic 322, the low state counting logic 324, and the high state counting logic 326 are described as each having their own circuit components, in other embodiments the counting logics may share one or more components. For example, the counting logics may share at least a MUX, a signal controller, and an event detector.

Beneficially, the power analysis logic 320 achieves savings of number of hardware implemented on the emulator 120. As an example, if a DUT includes one billion design signals to monitor, without the disclosed power analysis logic 320, at least one billion counters would have to be implemented for each state event. In order to count up to '256' samples of state events, each counter implements at least '8' registers (e.g., bits). Therefore, to track a number of toggles, low states and high states for each of the design signals 310 without the power analysis logic 320, a total of '24' billion registers would be needed. The power analysis logic 320 replaces '24' billion registers with only thousands of memories (e.g., embedded in FPGA), allowing a huge reduction of hardware implemented for performing power analysis.

Further, the power analysis logics 320 enables savings of logic circuitries implemented by multiplexing the design signals 310. For the example above, by multiplexing the design signals 310 of the DUT with a multiplexing rate of '100', '10' millions of the power analysis logics 320 may be implemented. By multiplexing, the power analysis logic 320 reduced counter logic implemented by approximately the multiplexing rate.

Additionally, by counting up to the predetermined threshold at the counter memory, the size of the accumulator may be further reduced. In addition, bandwidth for communicating with the host system 110 is reduced. For example, the predetermined threshold may be '4,' therefore each accumulator may require only '2' bits. Furthermore, the size of the accumulators 440 is further reduced. Moreover, bandwidth for communicating with the host system 110 is reduced compared to transmitting state event counts all at once or constantly, because transmission of the count update signal 330 is distributed and the count update signal 330 is transmitted in a binary representation when a count reaches the predetermined threshold.

Figure 6:
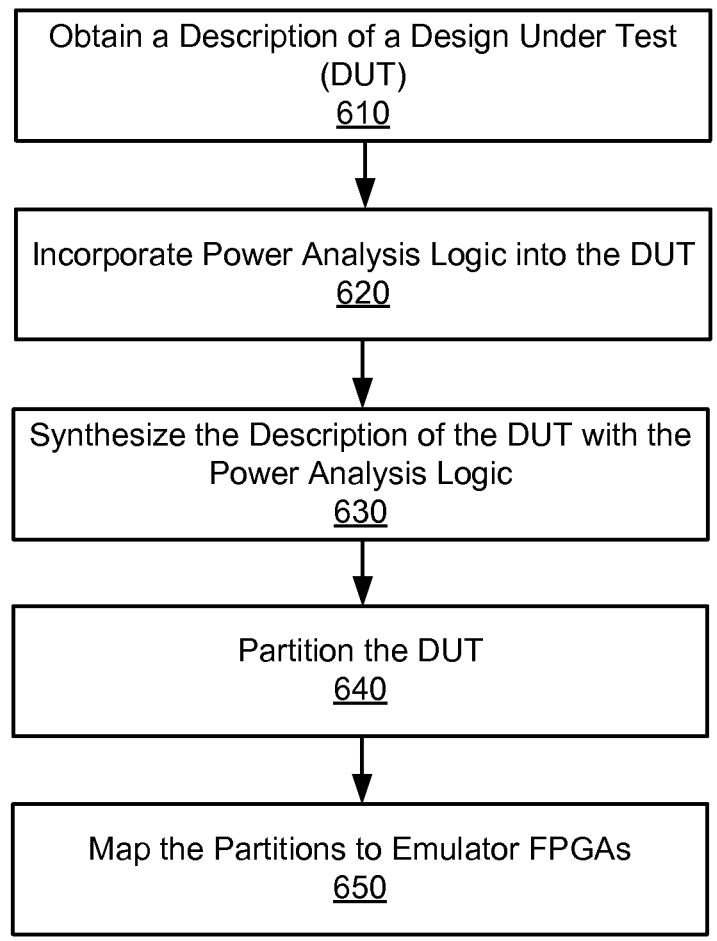
FIG. 6 is a flow chart illustrating the host system preparing a DUT for emulation, according to one embodiment.

FIG. 6 is a flow chart illustrating the host system 110 preparing a DUT for emulation, according to one example embodiment. Other embodiments can perform the steps of FIG. 6 in different orders. Moreover, other embodiments can include different and/or additional steps than the ones described here.

The host system 110 obtains 610 from a user a description of a DUT in HDL. The host system 110 incorporates 620 the power analysis logic 320 into the DUT by editing the HDL description of the DUT. The host system 110 synthesizes 630 the HDL description of the DUT with the power analysis logic 320 incorporated to create a gate level netlist. In another embodiment, instead of incorporating the power analysis logic 320 into the DUT prior to synthesizing, the power analysis logic 320 is incorporated after synthesizing the HDL description of the DUT.

The host system 110 partitions 640 the DUT at the gate level into a number of partitions using the gate level netlist. The host system 110 maps 650 each partition to one or more FPGAs of the emulator 120.

Figure 7:
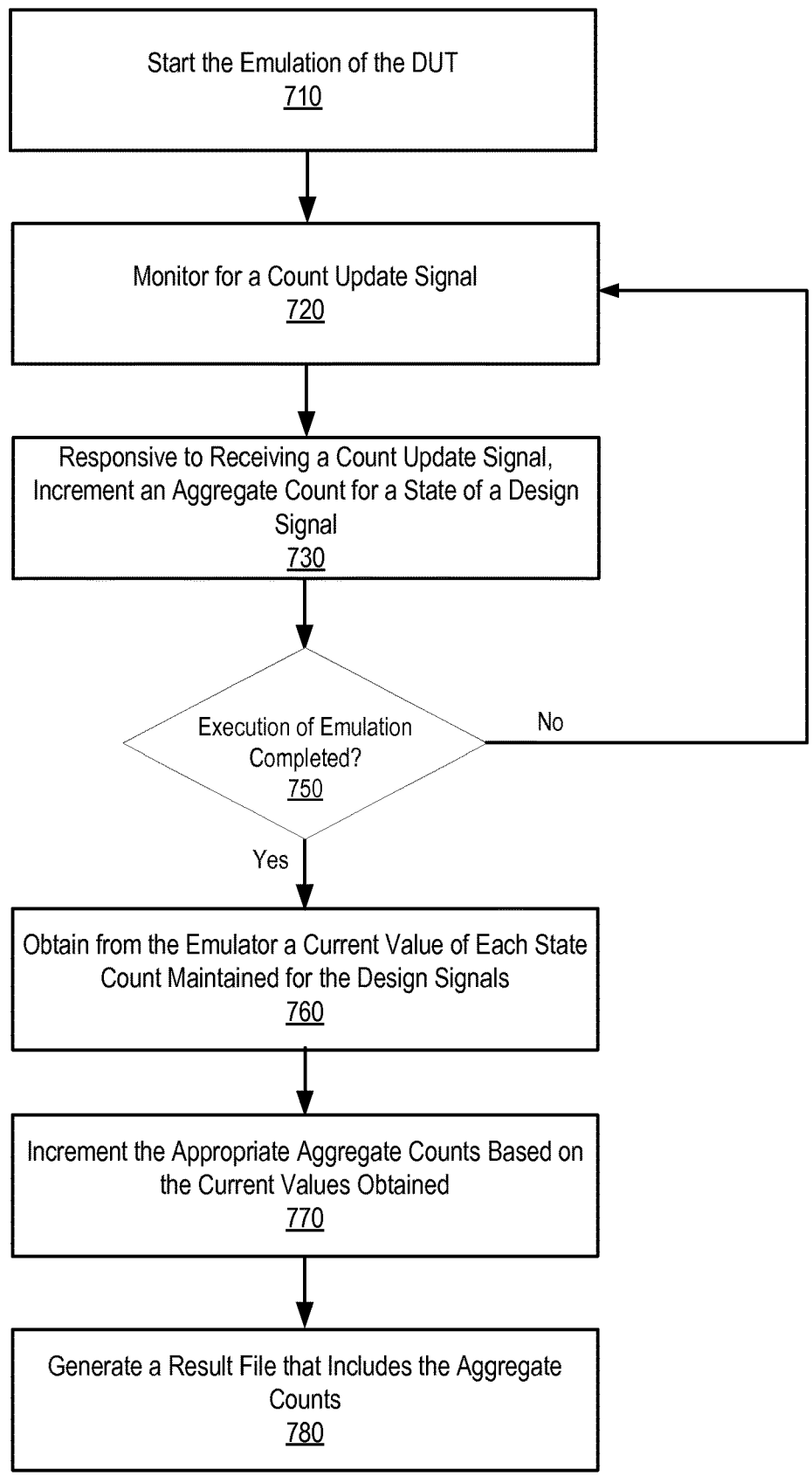
FIG. 7 is a flow chart illustrating the host system obtaining emulation results from an emulator during emulation of a DUT with the power analysis logic incorporated, according to one embodiment.

FIG. 7 is a flow chart illustrating the host system 110 obtaining emulation results from the emulator 120 during emulation of a DUT with the power analysis logic 320 incorporated, according to one embodiment. Other embodiments can perform the steps of FIG. 7 in different orders. Moreover, other embodiments can include and/or additional step than the one described here.

The host system 110 starts 710 the emulator 120 to execute the emulation of the DUT. The host system 110 monitors 720 for the receipt of a count update signal 330 from the emulator 120. In response to receiving a count update signal 330 from the emulator 120 indicating that a specific state count of a design signal 310 has reached a threshold number, the host system 110 increments 730 an appropriate aggregate count for a state of the design signal 310. Hence, if the count update signal 330 indicates that a toggle count of the design signal 310 has reached the threshold number, the host system 110 increments the aggregate toggle count of the design signal 310. Similarly, if the count update signal 330 indicates that a low count of the signal 310 has reached the threshold, the aggregate low count for the design signal 310 is incremented and if the count update signal 330 indicates that a high count of the signal has reached the threshold, the aggregate high count for the design signal 310 is incremented. In one embodiment, the host system 110 increments the appropriate aggregate count by the threshold number.

The host system 110 determines 750 whether the execution of the emulation is completed. If the execution of the emulation is not completed, the host system 110 returns to step 720 and monitors for additional count update signals 330. On the other hand, if the execution of the emulation is completed, the host system 110 obtains 760 from the emulator 120, for each design signal 310, a current value of each state count maintained for the design signal 310 (current value of at least the toggle count, low count, and high count).

For each design signal 310, the host system 110 increments 770 the appropriate aggregate counts based on the current values obtained (e.g., update aggregate toggle count with obtained current toggle count value). The host system 110 creates 780 a result file that includes the aggregate counts. Hence, for each design signal 310, the results file includes at least the total number toggles (aggregate toggle count), the total number of low states (aggregate low count), and the total number of high states (aggregate high count) that occurred during the emulation of the DUT.

Figure 8:
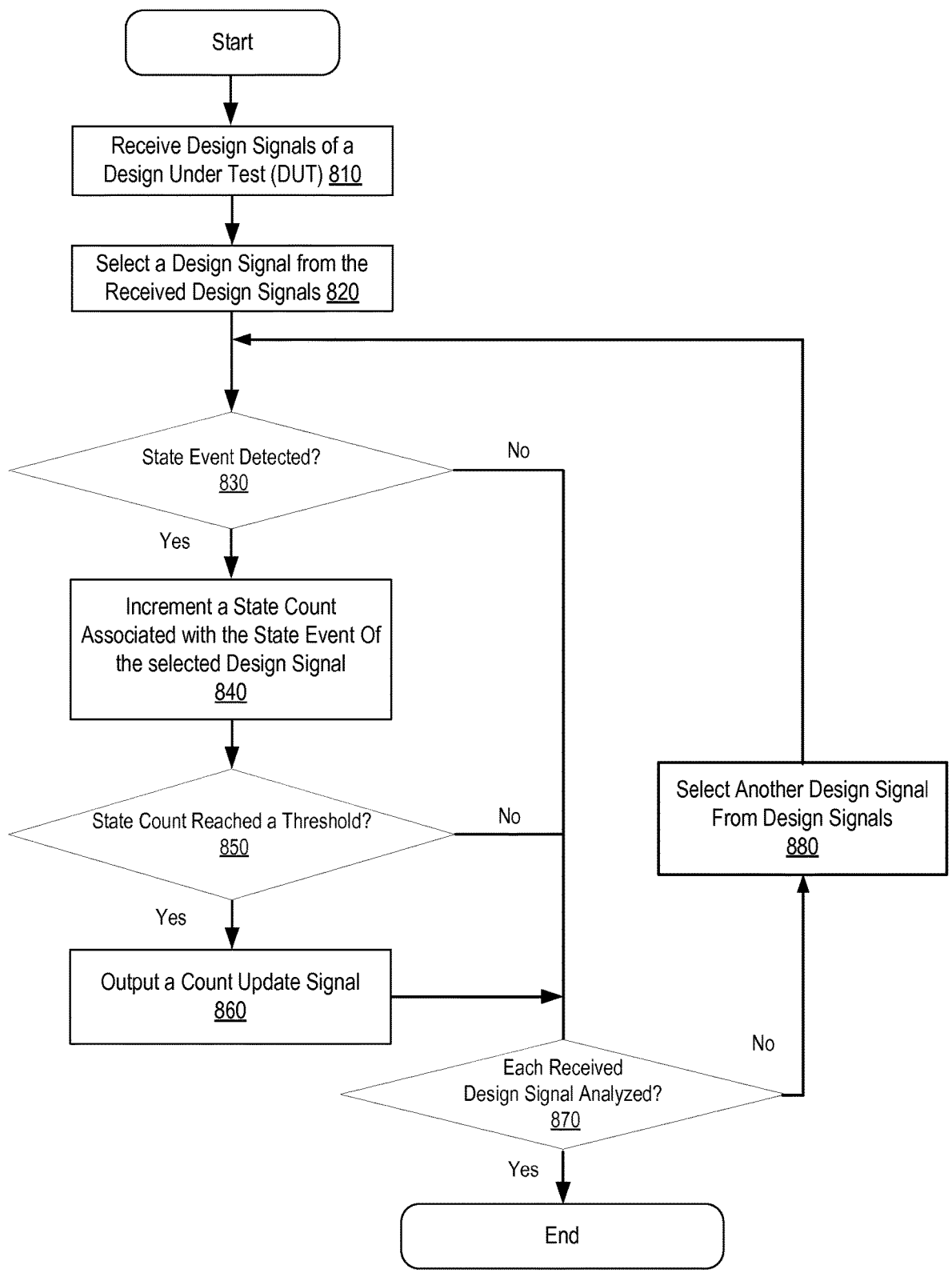
FIG. 8 is a flow chart illustrating a process performed by the emulator when emulating counting logic incorporated into a DUT, according to one embodiment.

FIG. 8 is a flow chart illustrating a process performed by the emulator 120 when emulating counting logic (toggle counting logic 322, low state counting logic 324, or high state counting logic 326) incorporated into a DUT, according to one example embodiment. The process illustrated in FIG. 8 is performed during a single design clock cycle of the DUT. The process is repeated for each subsequent design clock cycle. Other embodiments can perform the steps of FIG. 8 in different orders. Moreover, other embodiments can include and/or additional step than the one described here.

At the start of the process, the emulator 120 receives 810 multiple design signals of the DUT. The emulator 120 selects 820 a design signal 310 from the received design signals. The emulator 120 determines 830 whether a state event tracked by the counting logic (toggle event, low state event or a high state event) is detected for the selected design signal. If the state event is not detected, the emulator 120 skips to step 870 which is described below.

If the state event is detected, the emulator 120 increments 840 a state count associated with the state event of the selected design signal and determines 850 whether the state count has reached a predetermined threshold. If the state count has not reached the threshold, the emulator 120 skips to step 870 which is described below. If the state count has reached the threshold, the emulator 120 outputs 860 a count update signal to the host system 110 indicating that the state count of the selected design signal has reached the threshold. The process moves on to step 870.

In step 870, the emulator 120 determines 870 whether each received design signal has been analyzed during the current design clock cycle. If each design signal has not been analyzed, the emulator 120 selects 880 another design signal that has not yet been analyzed and skips to step 830. On the other hand, if each design signal has been analyzed during the current design clock cycle, the process ends.

Computing Machine Architecture

Figure 9:
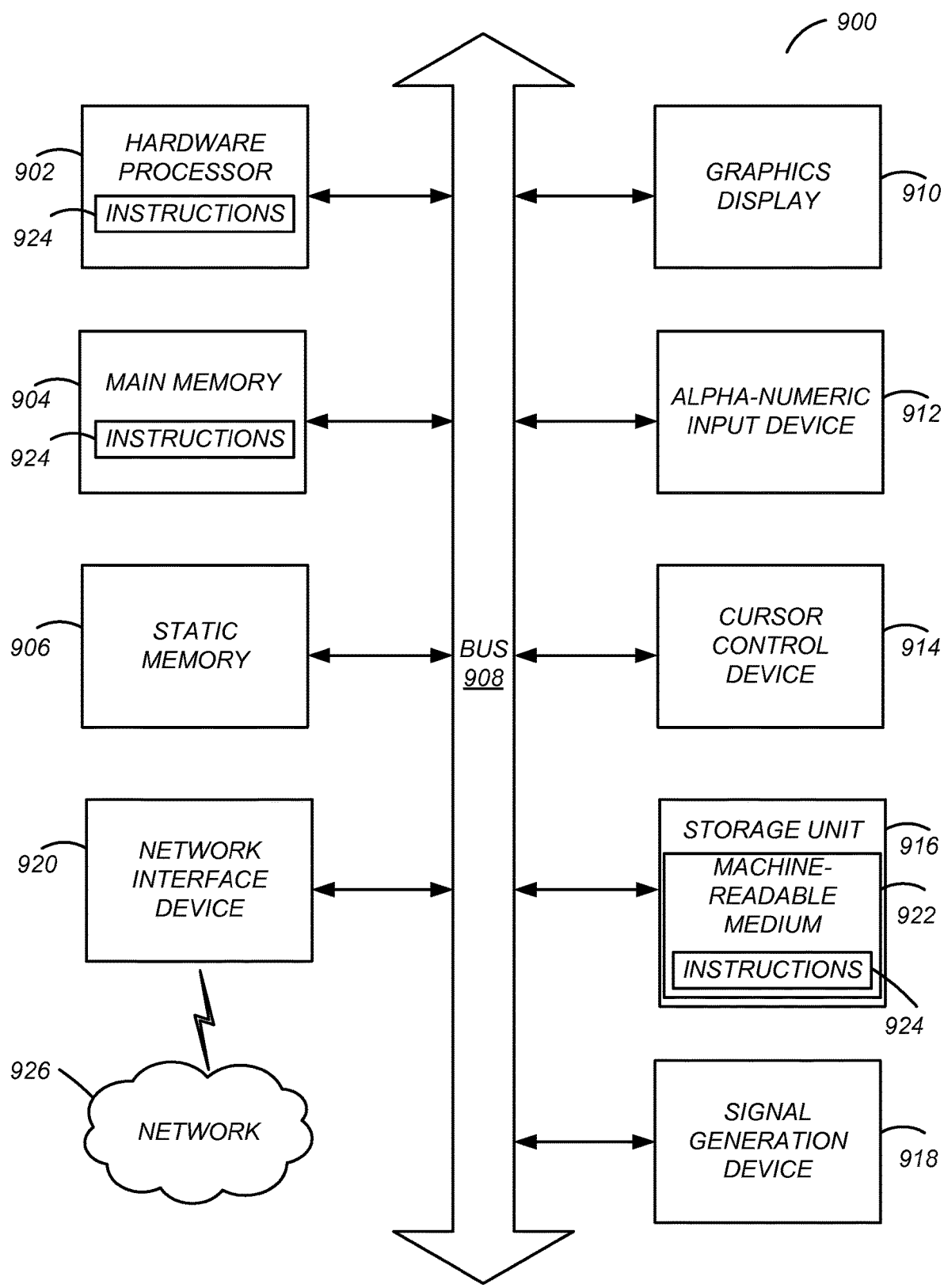
FIG. 9 illustrates one embodiment of components of an example machine able to read instructions from a machine-readable medium and execute them in a processor (or controller).

Turning now to FIG. 9, it is a block diagram illustrating components of an example machine able to read instructions from a machine-readable medium and execute them in a processor (or controller). Specifically, FIG. 9 shows a diagrammatic representation of a machine in the example form of a computer system 900 within which instructions 924 (e.g., software or program code) for causing the machine to perform (execute) any one or more of the methodologies described with FIGS. 1-8. The computer system 900 may be used for one or more of the entities (e.g., host system 110, emulator 120) illustrated in the emulation environment 100 of FIG. 1.

The example computer system 900 includes a hardware processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include graphics display unit 910 (e.g., a plasma display panel (PDP), a liquid crystal display (LCD), a projector, or a cathode ray tube (CRT)). The computer system 900 may also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 900 can have different and/or other components than those shown in FIG. 9. In addition, the computer system 900 can lack certain illustrated components. For example, a computer system 900 acting as the emulator 120 may include a hardware processor 902, a storage unit 916, a network interface device 920, and multiple configurable logic circuits (as described above with reference to FIG. 1), among other components, but may lack an alphanumeric input device 912 and a cursor control device 914.

Additional Configuration Considerations

It is noted that although the subject matter is described in the context of emulation environment for emulation of digital circuits and systems, the principles described may be applied to analysis of any digital electronic devices. Advantages of the disclosed configurations include sharing hardware resources to efficiently perform a power analysis of complicated digital circuits and systems, and saving bandwidth of data transferred between a host system and an emulator. Moreover, while the examples herein are in the context of an emulation environment, the principles described herein can apply to other analysis of hardware implementations of digital circuitries, including FPGA and ASIC or software simulation such as EDAs.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-8. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software (or computer program code)) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for efficient power analysis of a digital circuit through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium configured to store instructions for use in an emulation environment for an efficient design under test (DUT) power analysis, the instructions when executed by at least one processor, cause the at least one processor to:
    transmit a description of a DUT to an emulator, the description of the DUT comprising power analysis logic configured to track states of a plurality of signals of the DUT during emulation of the DUT, the power analysis logic comprising:
        a toggle counting logic comprising an event detector configured to detect toggle events for the plurality of signals, and an accumulator configured to maintain toggle counts indicating a number of toggle events for the plurality of signals, and
        a state counting logic comprising a state comparator configured to detect state events for the plurality of signals, wherein the state events are one of low state events or high state events, and an accumulator configured to maintain state counts indicating a number of state events for the plurality of signals;
    maintain a plurality of aggregate counts comprising:
        a toggle aggregate count indicating a total number of toggle events detected for a corresponding one of the plurality of signals during emulation of the DUT, and
        a state aggregate count indicating a total number of state events detected for a corresponding one of the plurality of signals during emulation of the DUT;
    responsive to receiving a toggle count update signal from the emulator during emulation of the DUT, update the toggle aggregate count, wherein the toggle count update signal is received each time the toggle count for the corresponding one of the plurality of signals reaches a predetermined number of toggle events during emulation of the DUT;
    responsive to receiving a state count update signal from the emulator during emulation of the DUT, update the state aggregate count, wherein the state count update signal is received each time the state count for the corresponding one of the plurality of signals reaches a predetermined number of state events during emulation of the DUT; and
    calculate power consumption of the DUT during the emulation using the plurality of aggregate counts.

2. The non-transitory computer readable medium of claim 1, wherein each state count is reset to an initial value responsive to reaching the predetermined number of state events, and each toggle count is reset to an initial value responsive to reaching the predetermined number of toggle events.

3. The non-transitory compute readable medium of claim 1, wherein the updating the toggle aggregate count, responsive to receiving the toggle count update signal, comprises incrementing the toggle aggregate count by the predetermined number of toggle events, and the updating the state aggregate count, responsive to receiving the state count update signal, comprises incrementing the state aggregate count by the predetermined number of state events.

4. A method comprising:
    transmitting a description of a design under test (DUT) to an emulator, the description of the DUT comprising power analysis logic configured to track states of a plurality of signals of the DUT during emulation of the DUT, the power analysis logic comprising:
        a toggle counting logic comprising an event detector configured to detect toggle events for the plurality of signals, and an accumulator configured to maintain toggle counts indicating a number of toggle events for the plurality of signals, and
        a state counting logic comprising a state comparator configured to detect state events for the plurality of signals, wherein the state events are one of low state events or high state events, and an accumulator configured to maintain state counts indicating a number of state events for the plurality of signals;
    maintaining a plurality of aggregate counts comprising:
        a toggle aggregate count indicating a total number of toggle events detected for a corresponding one of the plurality of signals during emulation of the DUT, and
        a state aggregate count indicating a total number of state events detected for a corresponding one of the plurality of signals during emulation of the DUT;
    responsive to receiving a toggle count update signal from the emulator during emulation of the DUT, updating the toggle aggregate count, wherein the toggle count update signal is received each time the toggle count for the corresponding one of the plurality of signals reaches a predetermined number of toggle events during emulation of the DUT;
    responsive to receiving a state count update signal from the emulator during emulation of the DUT, updating the state aggregate count, wherein the state count update signal is received each time the state count for the corresponding one of the plurality of signals reaches a predetermined number of state events during emulation of the DUT, and
    calculating power consumption of the DUT during the emulation using the plurality of aggregate counts.

5. The non-transitory computer readable medium of claim 1, further comprising instructions to:
    receive a final state count update signal comprising current values of the state counts for the plurality of signals, responsive to determining an end of the emulation of the DUT;
    update the state aggregate count at the end of the emulation of the DUT based on the current values to indicate a total number of state events detected for the corresponding one of the plurality of signals during emulation of the DUT;

receive a final toggle count update signal comprising current values of the toggle counts for the plurality of signals, responsive to determining the end of the emulation of the DUT; and update the toggle aggregate count at the end of the emulation of the DUT based on the current values to indicate a total number of state events detected for the corresponding one of the plurality of signals during emulation of the DUT.

6. The non-transitory computer readable medium of claim 1, wherein the toggle events are toggles of one of the plurality of signals between two states, and wherein the event detector is configured to:

compare a state of one of the plurality of signals during a current cycle of a clock of the DUT with a state of the one of the plurality of signals during a prior cycle of the clock, and detect at the toggle events, responsive to the state of the one of the plurality of signals during the current cycle being different from the state of the one of the plurality of signals during the prior cycle.

7. The non-transitory computer readable medium of claim 1, wherein a low state event is one of the plurality of signals having a low state.

8. The non-transitory computer readable medium of claim 1, wherein a high state event is one of the plurality of signals having a high state.

9. The non-transitory computer readable medium of claim 1, wherein state events and toggle events of a first signal of the plurality of signals are detected during a first cycle of a power analysis clock, state events and toggle events of a second signal of the plurality of signals are detected during a second cycle of the power analysis clock, and wherein the power analysis clock operates at a higher frequency than the clock of the DUT.

10. The method of claim 4, wherein each state count is reset responsive to reaching the predetermined number of state events, and each toggle count is reset responsive to reaching the predetermined number of toggle events.

11. The method of claim 4, further comprising:

receiving a final state count update signal comprising current values of the state counts for the plurality of signals, responsive to determining an end of the emulation of the DUT;

updating the state aggregate count at the end of the emulation of the DUT based on the current values to indicate a total number of state events detected for the corresponding one of the plurality of signals during emulation of the DUT;

receiving a final toggle count update signal comprising current values of the toggle counts for the plurality of signals, responsive to determining the end of the emulation of the DUT; and updating the toggle aggregate count at the end of the emulation of the DUT based on the current values to indicate a total number of state events detected for the corresponding one of the plurality of signals during emulation of the DUT.

12. The method of claim 4, wherein the toggle events are toggles of one of the plurality of signals between two states, and wherein the event detector is configured to:

compare a state of one of the plurality of signals during a current cycle of a clock of the DUT with a state of the one of the plurality of signals during a prior cycle of the clock, and detect toggle events, responsive to the state of the one of the plurality of signals during the current cycle being different from the state of the one of the plurality of signals during the prior cycle.

13. The method of claim 4, wherein a low state event is one of the plurality of signals having a low state.

14. The method of claim 4, wherein a high state event is one of the plurality of signals having a high state.

15. The method of claim 4, wherein the updating toggle aggregate count, responsive to receiving the toggle count update signal, comprises incrementing the toggle aggregate count by the predetermined number of toggle events, and the updating the state aggregate count, responsive to receiving the state count update signal, comprises incrementing the state count by the predetermined number of state events.

16. The method of claim 4, wherein state events and toggle events of a first signal of the plurality of signals are detected during a first cycle of a power analysis clock, state events and toggle events of a second signal of the plurality of signals are detected during a second cycle of the power analysis clock, and wherein the power analysis clock operates at a higher frequency than the clock of the DUT.

17. The non-transitory computer readable medium of claim 1, further comprising instructions to:

determine another state aggregate count by subtracting the state aggregate count from a total number of clock cycles for the emulation of the DUT, wherein the other state aggregate count indicates a total number of other state events for the one of the plurality of signals corresponding to the state count during emulation of the DUT, and the state events are low state events and the other state events are high state events, or the state events are high state events are low state events.

* * * * *

UNITED STATES PATENT AND TRADEMARK OFFICE
CERTIFICATE OF CORRECTION

PATENT NO. : 10,599,794 B2
APPLICATION NO. : 14/507687
DATED : March 24, 2020
INVENTOR(S) : Ludovic Marc Larzul et al.

Page 1 of 1

It is certified that error appears in the above-identified patent and that said Letters Patent is hereby corrected as shown below:

In the Claims

Column 18, Claim 3, Line 12, delete "compute" and insert --computer--.

Signed and Sealed this
Twelfth Day of January, 2021

Andrei Iancu
*Director of the United States Patent and Trademark Office*